(12) United States Patent
Johnson

(10) Patent No.: US 6,266,396 B1
(45) Date of Patent: Jul. 24, 2001

(54) DIGITAL CONTROL OF A SECURITY SYSTEM

(76) Inventor: Everitt O. Johnson, 7322 S. Wood St., Chicago, IL (US) 60636

( * ) Notice: Subject to any disclaimer, the term of this patent is extended or adjusted under 35 U.S.C. 154(b) by 0 days.

(21) Appl. No.: 09/401,049

(22) Filed: Sep. 22, 1999

Related U.S. Application Data

(60) Provisional application No. 60/111,963, filed on Dec. 11, 1998.

(51) Int. Cl.$^7$ .................................................. H04M 11/04
(52) U.S. Cl. ................................. 379/37; 379/42; 379/45
(58) Field of Search ............................ 379/37, 38, 39, 379/40, 41, 42, 43, 44, 45, 93.02, 93.03; 340/825.31, 825.34, 825.06, 506

(56) References Cited

U.S. PATENT DOCUMENTS

| | | | |
|---|---|---|---|
| 3,803,491 | 4/1974 | Osborn | 325/53 |
| 4,040,013 | 8/1977 | Carlson | 340/164 |
| 4,086,434 | 4/1978 | Bocchi | 179/2 |
| 4,141,006 | 2/1979 | Braxton | 340/505 |
| 4,141,046 * | 2/1979 | Braxton | 340/505 |
| 4,234,874 | 11/1980 | Saya | 340/539 |
| 4,258,357 | 3/1981 | Browell | 340/506 |
| 4,565,902 | 1/1986 | Phillips | 179/5 |
| 4,641,127 | 2/1987 | Hogan et al. | 379/40 |
| 4,665,544 | 5/1987 | Honda et al. | 379/104 |
| 4,893,324 | 1/1990 | Scown | 379/40 |
| 5,566,339 | 10/1996 | Perholtz et al. | 395/750 |

FOREIGN PATENT DOCUMENTS

002179186A  * 2/1987 (EP) .............................. G08B/21/00

* cited by examiner

Primary Examiner—Curtis Kuntz
Assistant Examiner—Melur Ramakrishnaiah
(74) Attorney, Agent, or Firm—Orum & Roth

(57) ABSTRACT

A method of remotely monitoring and operating a home and personal security system with the aid of digital computer manned by human operator, wherein the security system recognizes alarm conditions and responds to the alarm conditions comprising the steps of a) providing a computer for receiving and transmitting signals and including a database comprising user data, including at least one name, address, and telephone number of at least one user, at least one pass code, unique to and identifying each user, at least one alarm code representing a pre-identified alarm condition, operator data, including at least one telephone number of at least one human operator chosen from a pool of operators, emergency data including at least one telephone number of at least one emergency response unit. The method further comprises the steps of b) establishing a communication link between the data transmission device and the computer wherein the user enters a pass code and alarm code into the data transmission device and the device sends a signal to the CPU establishing a communication link and transmitting the entered pass code and alarm code to the computer; c) searching the computer data base and matching the transmitted pass code to the user data identifying the user's name, address and telephone number, and matching the transmitted alarm code to the pre-identified alarm condition; d) establishing telephone communication and at least one operator, and transmitting the identified user data and pre-identified alarm condition to the operator; e) establishing further telephone communication between at least one operator and at least one emergency response unit; f) transmitting the identified user data and pre-identified alarm condition to at least one emergency response unit.

9 Claims, 1 Drawing Sheet

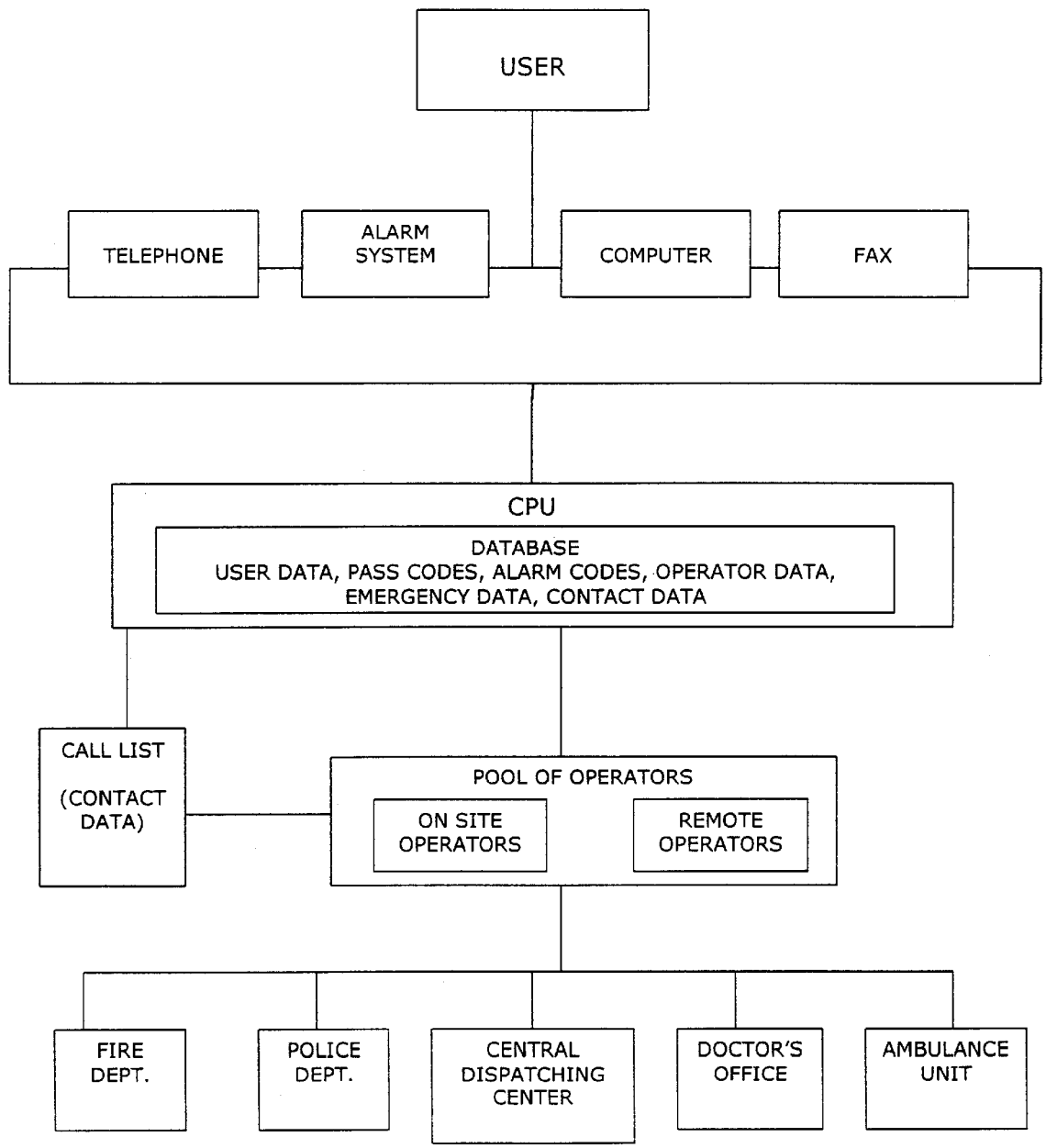

DIGITAL CONTROL OF A SECURITY SYSTEM

This application claims the benefit of U.S. Provisional Application No. 60/111, 963 filed Dec. 11, 1998.

BACKGROUND OF THE INVENTION

1. The Field of the Invention

The present invention relates to centrally monitored security or alarm systems and more particularly to remote monitoring and operating of home and personal security systems, using a digital computer manned by a human operator, for rapid, accurate, and automatic transmission of alarm condition to the appropriate emergency response unit.

2. Discussion of the Prior Art

Security, alarm or annunciator systems which employ central monitoring of conditions registered at remote locations have been known or have been described in the general and patent literature in recent years.

One such system teaches a plurality of remote stations each having one or more alarm sensors and a power supply for causing an alarm signal generator such as a relay, to signal a corresponding one of plural central alarm units by means of a telephone line when the sensor is tripped.

Other systems have disclosed designs for use with cable TV (community antennas) wherein a radio frequency signal representative of an alarm state, is sent to a central office via the cable network.

More recently, security systems of the centralized monitoring and reporting of remote alarm conditions type have been introduced which use sensors to identify the location of the premises under an alarm condition and the exact location within the premises where the alarm condition is present. The alarm sensors relay the information to a central facility, which automatically keeps record of vital alarm information and which can continuously monitor changes in the operational status of the subscriber units. Such systems can even verify whether a remote unit is actually in an alarm state, or whether the alarm state is due to a breakdown in the alarm equipment.

One of the most common and largest problems with any alarm system is the problem associated with false alarms. Most prior art security systems fail to provide a means for verifying whether the alarm is false. In some cities, false alarms have become such a nuisance to police, fire and medical rescue teams that some states now require that the alarm signal from such protection systems be verified before they send personnel to respond.

Another problem common to alarm systems is the valuable time wasted by the operator at the central monitoring station verifying whether the alarm is false. This is true even with municipal 911 systems since many of those systems require specific information before it is even assigned a level of response. In situations like a fire or an intruder, even a few valuable seconds can make the difference between life and death.

SUMMARY OF THE INVENTION

A primary object of the invention is to provide a method of remotely monitoring and operating a home and personal security system, using a digital computer manned by a human operator, for rapid, accurate, and automatic transmission of an alarm condition to the appropriate emergency unit.

It is also the object of the invention to provide a pre-programmed computer, of a well known type, with data storage banks containing user data including the name, address and telephone number of each user, a pass code unique to identifying each user, alarm codes representing pre-identified alarm conditions, operator data including at least one telephone number of at least one human operator chosen from a pool of operators, and emergency data including at least one telephone number of at least one emergency respondent. A communication link is established between a data transmission device and the computer wherein a user enters his assigned pass code and at least one alarm code into the data transmission device, whereby the device sends a signal to the computer establishing a communication link thereby transmitting the entered pass code and alarm code to the computer. The computer searches it's data base and first matches the transmitter pass code to the user's name, address and telephone number, and then matches the transmitted alarm code to the pre-identified alarm conditions.

The computer then establishes telephone communication with at least one operator from an available pool of operators and transmits the identified user data and the pre-identified alarm condition to that operator. The operator confirms with the user the accuracy of the identified user's data and alarm condition. Since state laws require that a human being establish communication with an emergency response unit, telephone communication is further established between the operator and at least one emergency response unit, with the operator relaying the identified user data and pre-identified alarm condition to at least one emergency response unit from the computer.

A further object of the invention is to provide a computer data storage bank including contact data, which includes at least one telephone number for at least one contact person associated with each user. Telephone communication is established between the computer and at least one contact person, transmitting the identified user data and the pre-identified alarm condition to the contact person in order to inform him that an alarm condition is activated.

Moreover, for further speed and accuracy in transmitting an emergency signal from the data transmission device to the computer and ultimately to an emergency response unit, the data transmission device can be pre-programmed with the telephone number which establishes telephone communication with the computer. Additionally, the data transmission device can be pre-programmed with the pass code and the alarm codes.

BRIEF DESCRIPTION OF THE INVENTION

FIGURE one is block diagram of the steps in a method of remotely monitoring and operating a home and personal security system with the aid of a digital computer.

DESCRIPTION OF THE PREFERRED EMBODIMENT

The security system according to the claimed invention, is a subscriber-based system that includes a computer or central processing unit (CPU). a data transmission device for communicating an alarm condition to the CPU, and a means for communicating with the CPU, the user, and an emergency response facility. The CPU is capable of transmitting and receiving information over a standard telephone line and, is pre-programmed to store information and execute specific commands.

The CPU has a database comprising user data of at least one name address and telephone number of at least one user. Preferably, the user data will include this information for each user of the security system. The CPU is programmed to assign an individual pass code to each user. The pass code can include any number of digits in any combination of letters or numbers, and preferably includes a 3-digit sequence. The CPU stores other information relating to each user, such as contact data including at least one telephone number of at least one contact person associated with each user, in which to call in order to inform of an emergency.

The database of the CPU also includes alarm codes representing a pre-identified alarm condition. The alarm codes are made up of pre-identified designator codes designating emergency calls and non-emergency calls, and alarm types further defining an alarm condition such as burglary or fire, etc. The database further includes operator data including at least one telephone number of at least one human operator. Preferably the operator data includes a telephone number for each operator in a pool of operators. Additionally, the database includes emergency data, comprising at least one telephone number of at least one emergency response unit, in the vicinity of each user. Preferably, the emergency data comprises at least one telephone number for each of a police department, fire department, ambulance unit, central dispatching center and doctor's office in the vicinity of each user.

The data transmission device is capable of transmitting and receiving information over a standard telephone line, and may include a digital communicator for receiving input from well known alarm system hardware, such as motion detectors, and physical transmitters, etc. The data transmission device may include a touch tone telephone, fax machine, computer, burglar alarm system, as well as devices which can communicate with standard telephone lines, such as cellular phones.

Communicating that an alarm exists begins with the user contacting the CPU, wherein the CPU initiates contact with a human operator selected from a pool of available operators. Each operator is equipped with a standard telephone, capable of communicating with the CPU over a standard telephone line, and the operator can be located at the same, or a different site from where the CPU is located. Preferably, more than one operator making up a pool of operators is employed to monitor the security system. This both ensures that at least one operator is available to handle a user's emergency call, and also enables the CPU to simultaneously communicate with a first operator handling a first call from a first user, and a second operator handling a second call from a second user.

The manner in which the security or alarm system of the invention is remotely monitored and operated using the digital computer and human operator is diagrammatically shown in FIG. 1. The CPU includes a pre-programmed database as described above, receives and transmits signals, and recognizes and responds to alarm conditions.

In a preferred method, the user will initiate an emergency response by dialing the telephone number of the CPU at the central processing station. The CPU will answer the user's phone call, establishing an initial communication link, and will prompt the user to enter his assigned pass code. The user will enter his pass code, and at least one designator code into the data transmission device and the data transmission device sends a signal to the computer establishing the communication link and transmitting the entered pass code and designator code to the CPU.

The designator code can be any number of digits or symbols, and preferably is a one digit code of either the star (*) or pound (#) symbol. For example, the user seeking to obtain emergency assistance, would enter a star sign (*) as their designator code, and the user seeking customer service would enter a pound sign (#) as their designator code.

The user also has an option to enter an alarm type into the key pad of their phone. The alarm type can also be any number of digits or symbols, and preferably is also a one digit code. The alarm type can be combined with the emergency designator code forming an alarm code. The alarm type will provide further information regarding the emergency condition, to the CPU, and eventually to the emergency personnel. For example, if the user is seeking assistance from the fire department, the user would press in the number one as the alarm type. Additionally, a user could press in a number two to indicate a burglary in progress, or the number three to indicate a burglary at the basement door. An entire series of numbers can be assigned to designate various alarm types, and enable the user to relay specific information regarding the emergency situation to the emergency response personnel with the press of just one button. If no alarm type is entered, the CPU is pre-programmed to automatically default to the police as the alarm type. A call placed without an alarm type would provide the police only with general information that assistance is needed at this user's address, without any further information regarding the emergency situation.

Preferably, the user will pre-program their telephone with the phone number of the CPU, as well as with their pass code number, and emergency designator symbol coupled to the various alarm type options. The pre-programming of the user's telephone, will allow a user to make an emergency call with the push of just one button.

The method of the present invention will reduce the possibility of making a dialing error in an emergency situation, and will also speed up the process of making the initial phone call to the CPU. A benefit of the present invention is that the user is able to rapidly transmit accurate and specific information to the CPU and eventually to the emergency personnel, with the push of just one button. Since the amount of information transmitted back and forth from the CPU is extremely small, just 7 digits or so, the information can be sent so rapidly that the transmissions happen almost in real time, with only a few seconds delay. This rapid transmission of data is critical in an emergency situation. Additionally, the user has access to a low cost alarm system, because no standard alarm system hardware such as motion detectors and physical transmitters are needed for the method of the claimed invention. The user need only be equipped with a standard telephone, preferably a programmable telephone as are well known in the art, to operate the alarm system of the present invention.

Immediately after the CPU receives the entered pass code and alarm code (designator type and alarm type), the CPU searches its database and matches the user's pass code to the user data identifying the users name and address and telephone number, and matches the transmitted alarm code to the pre-identified alarm condition. The CPU will print this information to a screen and record the telephone number from where the user's call was made, storing this information for future use if needed.

The CPU will then establish telephone communication with an operator chosen from a pool of operators stored in the CPU's data bank. In order for the operator to communicate with the CPU and further proceed in communicating with the emergency personnel, the operator need only to be equipped with a standard telephone connected to a standard telephone line.

The call to the operator from the CPU is automatically placed after the CPU has identified the user's pass code. If the first operator called by the CPU is not available, or not answering the phone, the CPU will proceed down the list of operators until the CPU connects with an available operator.

Once the operator answers the call establishing communication with the CPU, the CPU transmits the identified user data, including the user name, address, telephone number, and pass code, and the pre-identified alarm condition to the operator. This information is transferred to the operator via a computer generated voice traveling over a standard phone line. The operator takes note of the information conveyed by the CPU and the CPU then prompts the operator to either repeat the message over again, or react to the emergency call by indicating that the CPU should now call the emergency facility. The operator can indicate to the CPU, through any designated number or combination of digits and symbols entered into the operator's telephone key pad, to repeat the whole message sent by the CPU, repeat just a specific part of the message, or dial the emergency facility. For example, the operator can enter the digit "1" to repeat the whole message, the digit "2" to repeat the user's address, or the "*" symbol to tell the CPU to dial the emergency facility. The CPU will wait for only a limited amount of time, preferably 10 seconds or less, for the operator to enter a digit or symbol into the telephone key pad. If no response or an inappropriate response is received by the CPU, the CPU will automatically disconnect from this operator, and proceed down the pre-programmed list to establish contact with the next available operator. This step provides a fail-safe mechanism whereby the CPU will continue to search for an operator which will complete the call to the emergency facility, preferably by depressing the "*" button telling the CPU to call the emergency facility. In the appropriate situation, the first operator can re-initiate the call if disconnected, by entering in the pass code of the user.

Once the operator indicates that the emergency facility should be called, the CPU will automatically establish further telephone communication between the operator and an emergency facility, whose telephone number is pre-programmed into the CPU and relates to the alarm code transmitted to the CPU by the user. For example, the CPU can be programmed to call the fire department, police department, or central emergency dispatching center, depending upon the State regulations of the City where the user is located. In many states, including Illinois, a call to an emergency facility must be made by a person, rather than a machine, like an alarm system.

The CPU will automatically establish communication between the operator and the emergency personnel or dispatching center once the call to the emergency facility is answered. The operator transmits to the emergency response unit or dispatching personnel, the identified user data including at least the users' name. address, telephone number and pre-identified alarm condition.

The CPU will maintain a connection with the operator until the call is completed. The CPU is programmed to interpret that the emergency call is completed only after the operator has indicated that the emergency personnel have responded to the call. Preferably, the operator will receive confirmation from the emergency facility or dispatching center that emergency personnel have responded to the emergency call, and the operator will be given the badge number of the person responding to the call. Once the operator transmits this badge number to the CPU, the CPU will disconnect from the operator interpreting that the call is completed.

If for some reason the operator does not transmit a badge number to the CPU, by entering the badge number into the telephone keypad, the CPU will disconnect from that operator and establish communication with the next available operator chosen from the pool of operators pre-programmed into its database. This is another fail-safe mechanism in which the CPU will not be satisfied that the emergency call has been completed until it receives information from the operator regarding the emergency personal responding to the alarm condition.

The CPU is further programmed to finally proceed to a call list of people to contact in order to inform of the emergency. The CPU will establish telephone communication with at least one contact person associated with each user and transmit the identified user data and pre-identified alarm condition to the contact person. The CPU will move down the call list placing calls to each person, one after another if contact is not made with the preceding person on the call list. The user has the option to pre-program as many names and numbers as they prefer to establish their call list, and can request to have the CPU continually repeat the call list until a person from the list establishes communication with the CPU. Alternatively, the CPU will contact each person on the call list, and after the last call, whether answered or not, the CPU will disconnect from the last person on the list and not make any further attempts to contact persons from the list. After the computer disconnects from the last person on the call list, the call is complete and the CPU waits for the next call.

In a preferred embodiment of the invention, once the operator establishes communication with the CPU and receives the identified user data and pre-identified alarm condition, the CPU establishes telephone communication between the operator and the user, so that the operator can confirm the accuracy of the transmitted user data and alarm condition with the user. The operator transmits to the CPU, confirmation that the information is correct and prompts the CPU to establish telephone communication between the operator and the appropriate emergency response facility.

The CPU has several time-out terminator points, defined as points where the CPU will automatically disconnect from the user or the operator. These points can occur after, for example, a completed call, the entry of an improper pass code, the entry of digits not recognized as a pass code, or the non-entry of a badge number by the operator.

If a user happens to be in an emergency situation in a location different from their home or business address which is assigned to their pass code, the user can switch over to a manual mode and relay a spoken message to the operator. For example, by simply entering their pass code and the designator code twice into the telephone key pad, the user can then speak a message that is received by the CPU. When the designator code is entered in duplicate, the CPU will answer the call and then switch to a manual mode. The user can speak in a message relating to the emergency condition and their location, this spoken information is then relayed to the operator, and the following steps are followed as outlined above.

The central processing station can handle an unlimited amount of calls. The CPU can be expanded to handle additional phone calls by adding a buffer system, or it can be expanded by adding more phone lines as is well known in the art. The CPU can also be connected in tandem with additional CPU's, in the alternative or in addition, to the added buffer system and additional phone lines.

In a preferred embodiment of the invention, the user will be able to send an alarm signal to the central processing station, indicating a home invasion, or burglary in progress, with the press of just one button. The benefit to the user is a reliable home burglar alarm system at a fraction of the cost of current burglar systems. The user would only need a standard telephone, preferably one which is programmable in order to have access to this low cost burglar alarm system. Additionally, the user will not have to undergo the expense or inconvenience of installing physical transmitters or motion detectors in their home.

In another embodiment, the user can communicate with the CPU in order to obtain information in addition to transmitting information to the CPU. For example, the user can enter a non-emergency designator code into his keypad in order to retrieve personal records such as bank status, insurance information, etc., previously downloaded and held for safekeeping by the CPU. In case of catastrophes such as flooding or severe weather, the user can access vital information regarding these conditions from the CPU. Additionally, the CPU can be proofread to disseminate to all or just some of its users by way of a mass distribution of the information regarding important events held by organizations such as churches, schools and businesses.

In another embodiment of the invention, the CPU can receive emergency signals from a mechanical alarm system. A typical home security system as is well known in the art, can incorporate a perimeter system, motion detectors, and other various security hardware which will send an alarm signal to a digitizer in the home. The digitizer communicates via a standard phone line with the CPU of the present invention. The digitizer will send a frequency over the phone line, which will be intercepted by the CPU. The CPU will initiate a handshake with the digitizer, by sending a series of frequencies, typically within the range of 300 through 3,000 hertz, over the phone line in order to establish a match with the frequency sent by the digitizer. When a match is found between the CPU and the digitizer frequencies, a handshake or verification will be established, and the CPU will lock into the frequency of the digitizer. The passcode and emergency information will then be transferred from the alarm digitizer to the CPU. The CPU receives the information and verifies that it is good information and sends a return kiss off signal to the alarm digitizer, disconnecting itself from the alarm digitizer.

The CPU will then conduct a database search in order to match the pass code received from the digitizer, with the user information in its database. Once again, the user information will include, at a minimum, the customers name, address, and phone number, and the CPU will print this information along with the alarm type to the screen. The CPU will automatically call the home or business from where the digitizer signal was sent, in order to verify that the call was not a false alarm. The CPU looks for verification from the person receiving the call that this is not a false alarm. Preferably, a user enters their pass code into the telephone keypad, the CPU is pre-programmed to interpret that information as an indication that the call was a false alarm. If a pass code is not entered by the person receiving the phone call, if nothing is entered, or the call does not go through within a designated time period, 5 seconds for example, the CPU will automatically take steps to establish communication with an operator and an emergency facility. The CPU will search for an operator, and follow the same remaining steps as outlined above.

The alarm system of the present invention provides the benefits of being capable of adapting any alarm system a user may currently possess, or can be used just with the user's own standard telephone as described above.

The foregoing description has been provided to clearly define and completely describe the present invention. Various modifications may be made without departing from the scope and spirit of the invention which is defined in the following claims.

What is claim is:

1. A method of remotely monitoring and operating a home and personal security system with the aid of a digital computer manned by a human operator, chosen from a pool of operators, said security system recognizing alarm conditions and responding to said alarm conditions, comprising the steps of:

a) providing a computer for receiving and transmitting signals and including a database comprising:
 user data, including at least one name, address, and telephone number of at least one user;
 at least one pass code, unique to and identifying each user;
 at least one alarm code, representing a pre-identified alarm condition;
 operator data, including at least one telephone number of at least one human operator chosen from said pool of operators;
 emergency data, including at least one telephone number of at least one emergency response unit;

b) establishing a communication link between a data transmission device and said computer, wherein said at least one user enters said at least one pass code and said at least one alarm code into said data transmission device and said data transmission device sends a signal to said computer establishing said communication link and transmitting said entered pass code and alarm code to said computer;

c) searching said computer database and matching said transmitted pass code to said user data identifying said at least one users' name, address and telephone number, and matching said transmitted alarm code to said pre-identified alarm condition;

d) establishing telephone communication between said computer and said at least one operator, and transmitting said identified user data and said pre-identified alarm condition to said at least one operator;

e) establishing further telephone communication, through said computer, between said at least one operator and said at least one emergency response unit;

f) transmitting said identified user data and pre-identified alarm condition to said at least one emergency response unit.

2. The method according to claim 1, wherein step d) further comprises the step of confirming by said operator the accuracy of said identified user data and said pre-identified alarm condition with said user, and transmitting said confirmation to said computer, prompting said computer to initiate step e).

3. The method according to claim 2, wherein the step of confirming by said operator comprises the step of establishing telephone communication, through said computer, between said operator and said user.

4. The method according to claim 1, further comprising the step of g) entering a badge number by said operator into said computer, wherein said badge number identifies a person from said at least one emergency response unit responding to said pre-identified alarm condition.

5. The method according to claim 2, wherein said computer database further comprises contact data, including at least one telephone number of at least one contact person associated with said at least one user, and further comprising the steps of h) establishing telephone communication between said computer and said at least one contact person; and i) transmitting said identified user data and pre-identified alarm condition to said at least one contact person.

6. The method according to claim 1, wherein said emergency response unit comprises one of a police unit, fire unit, ambulance unit, central dispatching center, and doctor's office.

7. The method according to claim 1, wherein said data transmission device comprises one of a touch tone telephone, fax machine, computer, and burglar alarm system.

8. The method according to claim 1, wherein said data transmission device is further pre-programmed with a telephone number linked to said computer of said security system.

9. The method according to claim 7, wherein said at least one pass code is comprised of three digits, said at least one alarm code comprised of one digit, and said data transmission device is preprogrammed with said at least one pass code and said at least one alarm code.

* * * * *